C. A. SEELY.
Electric Apparatus.
No. 26,445.
Patented Dec. 13, 1859.
Nº 1.
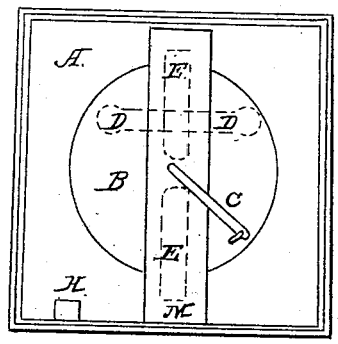
Nº 2.
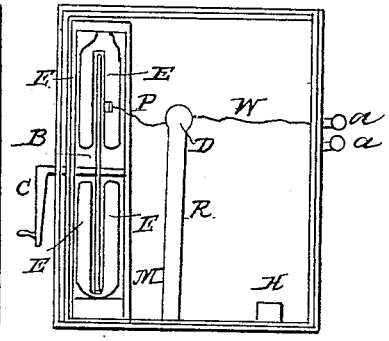
Nº 3.
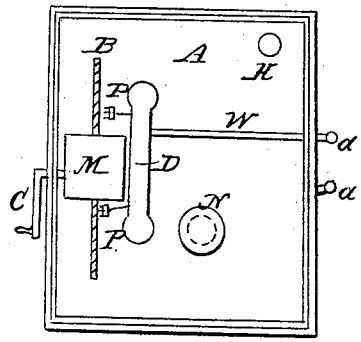
Nº 4.
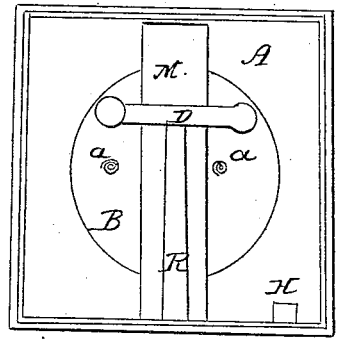
Witnesses
Inventor
Charles A. Seely

UNITED STATES PATENT OFFICE.

CHARLES A. SEELY, OF NEW YORK, N. Y.

IMPROVED METHOD OF PROTECTING FRICTIONAL ELECTRICAL MACHINES FROM MOISTURE.

Specification forming part of Letters Patent No. 26,445, dated December 13, 1859.

*To all whom it may concern:*

Be it known that I, CHARLES A. SEELY, of New York, county and State of New York, have invented a new and Improved Mode of Constructing Electrical Machines; and I do hereby declare that the following is a full and exact description thereof, reference being had to the accompanying drawings and to the letters of reference marked thereon, making part of this specification, in which—

Figure 1 is a back view of the machine. Fig. 2 is an end view. Fig. 3 is a top view. Fig. 4 is a front view.

The same letters indicate the different views of the same parts in the several figures.

One of the principal difficulties in the way of a more general and advantageous use of the electrical machine has been its susceptibility to the changes in the atmosphere and other surrounding substances, often causing a great loss in the effective power of the machine in certain states. It is one of the aims of my invention to remedy this among other defects of such instruments.

The nature of my invention consists in inclosing the machines in a close covering or box and providing said box or covering with some absorbent of moisture, by which the atmosphere and other materials that surround the machine are kept dry, and also by making this covering or box of some good insulating substance in condensing the electricity generated by the machine, thus preserving loss and greatly increasing its power and constancy.

To enable others skilled in the art to make and use my invention, I will proceed to describe its construction and operation.

I construct my electrical machine in any of the known forms, and apply to it an incasing box or covering which is so constructed as to be nearly or quite air-tight. In this box or covering I place an absorbent of moisture, which keeps the air about the machine uniformly dry, and secures to the machine a constant and uniform action, and protects it against the changes in the atmosphere, to which it is otherwise so susceptible, and when this covering or box is made of some good insulating substance the power of the machine is greatly increased by preventing the loss of and condensing the electricity that is generated.

In these drawings, representing one form of construction, A represents the covering or box inclosing the machine, in this case made of panes of glass forming all sides of the box, and glazed into light sashes of wood; or it may be sealed about at the edges.

B is a plate of glass made to turn upon an axis by the crank C, and upon which the electricity is generated as the plate revolves against the rubbers E E E E.

D is a prime conductor, supported upon an insulating-pillar, R.

M is a frame-work supporting the glass plate B.

P is a conductor leading from the plate B to the prime conductor D.

W is a wire leading from the prime conductor D.

a a are small brass balls attached to conducting-wires passing through the box in front and closely sealed in the glass.

H H is the absorbent of moisture within the box, in this case a small quantity of chloride of calcium.

N is an opening in the pane of glass upon the top of the covering or box, through which the hand may be passed to adjust the parts within the box, and which may be closed air-tight at pleasure. The axis upon which the plate B is fixed and revolves extends out through the back side of the covering or box, and to which the crank C is attached, thus enabling the operator to turn the plate at pleasure without opening the box.

I do not limit my invention to this or any other known form of electrical machine, believing, as I do, that my invention is applicable to any form; nor do I limit myself to this form or kind of covering or box for the machine; nor to the absorbent mentioned above; but What I do claim, and desire to secure by Letters Patent, is—

1. Inclosing an electrical machine in a covering or box which is nearly or quite air-tight, and by means of an absorbent of moisture preserving the air about the machine nearly uniformly dry.

2. The insulating covering or box, substantially as described, and for the purposes specified.

CHARLES A. SEELY.

Witnesses:
HENRY GARLANSTO,
ARCH. WILSON.